F. A. BUCKNAM.
DISK GANG FOR USE IN HARROWS AND SIMILAR TILLAGE IMPLEMENTS.
APPLICATION FILED DEC. 22, 1913.
1,157,080.
Patented Oct. 19, 1915.
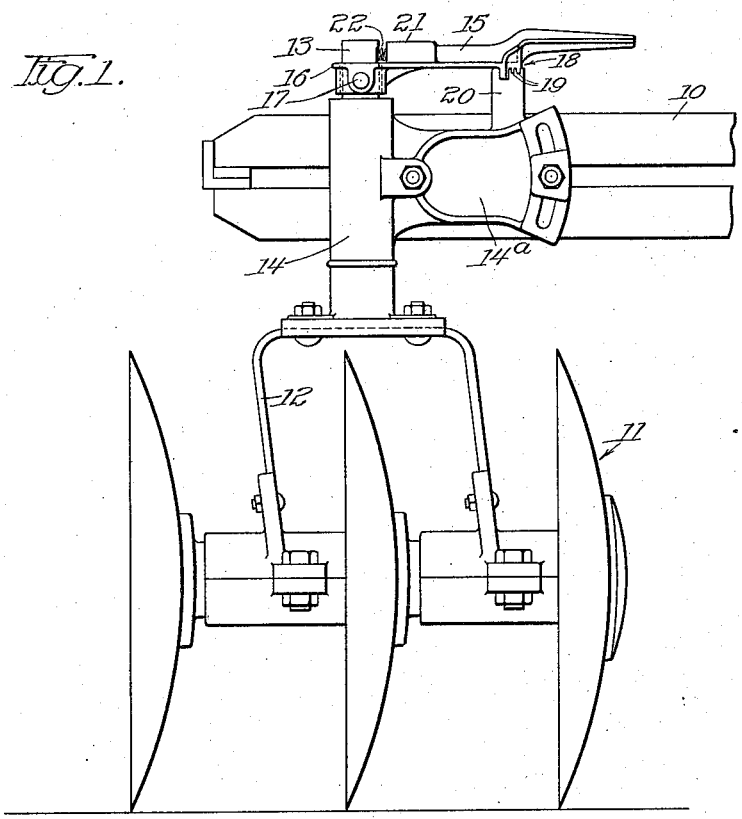
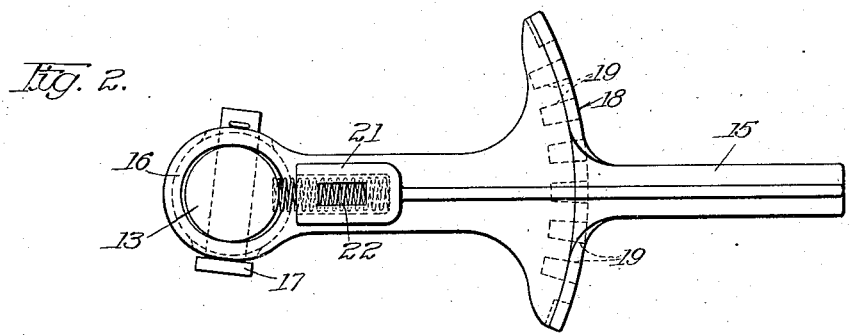
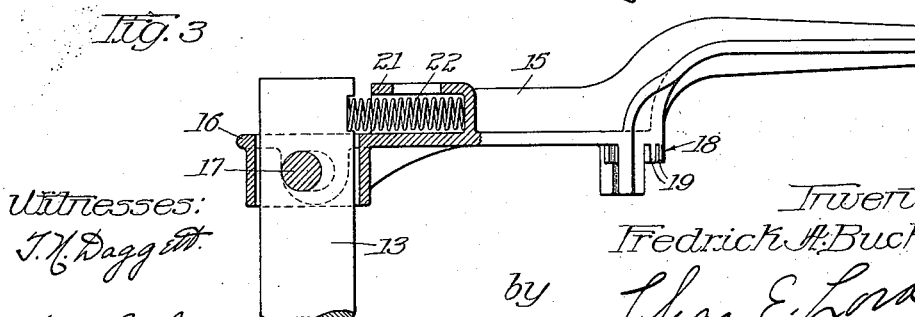
Witnesses:
Inventor.
Fredrick A. Bucknam.
by Chas. E. Lord
Atty.

UNITED STATES PATENT OFFICE.

FREDRICK A. BUCKNAM, OF AUBURN, NEW YORK, ASSIGNOR TO INTERNATIONAL HARVESTER COMPANY OF NEW JERSEY, A CORPORATION OF NEW JERSEY.

DISK GANG FOR USE IN HARROWS AND SIMILAR TILLAGE IMPLEMENTS.

1,157,080.      Specification of Letters Patent.      Patented Oct. 19, 1915.

Application filed December 22, 1913. Serial No. 808,131.

*To all whom it may concern:*

Be it known that I, FREDRICK A. BUCKNAM, a citizen of the United States, residing at Auburn, in the county of Cayuga and State of New York, have invented certain new and useful Improvements in Disk Gangs for Use in Harrows and Similar Tillage Implements, of which the following is a full, clear, and exact specification.

This invention relates to disk gangs for use in harrows and similar tillage implements.

It is the object of my invention to improve and simplify the construction and operation of the means employed in connection with disk gangs for shifting them about their vertical pivot points. This object I accomplish by the employment of a novel and inexpensive form of arm, or lever, pivoted to the vertically arranged shaft of the gang members and operating in an improved way to shift said members in a horizontal plane and retain them in adjusted positions.

One form which my invention may assume is exemplified in the following description and illustrated in the accompanying drawing, in which—

Figure 1 shows a rear elevation of a disk gang applied to a harrow frame and having my invention embodied therein; Fig. 2 shows a plan view of the shifting arm employed in my device; and Fig. 3 shows a side elevation of the same with a portion thereof broken away for the sake of clearness.

Referring in detail to the drawing, a portion of a harrow frame 10 is shown, provided with a disk gang 11. A forked member 12, upon which is mounted a vertical shaft 13, assists to connect the disk gang in proper position on the frame; the vertical shaft 13 being mounted in the usual manner in a bearing 14, which bearing is carried on the frame 10, and is made adjustable thereon for the purpose of permitting changes to be made in the vertical plane of the gang member, through the medium of the integral wing member 14ª.

For adjusting the gangs in a horizontal plane, I have provided an improved lever 15, having formed at one end an eye portion 16, which encompasses and is slightly spaced apart from the vertical shaft 13. A pin 17, or similar device, is used for pivoting the lever to the said shaft, and the space between the periphery of the shaft and the surrounding wall of the eye portion is sufficient to permit a slight hinged movement of the lever in a vertical direction. Intermediate the ends of the lever is an integrally formed sector, or quadrant, 18, provided with teeth 19; and formed upon the wing portion of the bearing 14 is an upwardly extending detent 20, which is adapted to engage between the teeth 19 and hold the lever 15 securely against horizontal movement. Adjacent the shaft 13 on the lever is a casing 21, within which is carried an extensible coiled spring 22, engaging at one end the shaft 13 and at the other one of the walls of the casing 21; in this way operating to normally hold the lever 15 in its lowermost position, thereby retaining, in a yielding manner, engagement of the sector 18 with the detent 20.

When it is desired to adjust the disk gangs for the purpose of changing their cutting angles with respect to the line of draft, the operator has only to grasp the outer end of the lever 15, and raise it against the pressure of the spring 22 a sufficient distance to disengage the sector and detent, whereupon it may be shifted in either direction, with the shaft 13 as a center, changing in this way the disk of each member of the gang. As soon as the operator releases the lever, the spring 22 causes it to move downwardly, thereby reëngaging the sector and detent and locking the disk gang securely in its adjusted position.

By the use of my improved device the usual spring controlled detent is eliminated and the operation of shifting the lever is in consequence much simplified. By locating the spring 22 as shown in my device, it requires but a minimum of space and is completely out of the way of the other parts of the machine in which it is used.

An important feature of this construction is to be found in its capacity for permitting the disks to be changed from inthrow to outthrow, and vice versa, by merely turning them through an angle of 180° on their vertical axis, in which case the arm-lever 15, being extended away from the detent lug, may be easily removed by withdrawing the pin 17 and turned about to again coact therewith. In practice, the frame member 10 usually carries two gangs arranged to straddle a row of plants, and it is obviously of great advantage to have the direction of their throw reversible.

Another important advantage in connection with my device is that the detent 20, by reason of being mounted upon the wing portion of the bearing 14, maintains a relatively fixed position with the sector 19 at all times and, regardless of any change in the vertical plane of the disk gang 11, the sector and detent will always be in proper positions for insuring engagement.

While I have shown and described but one application of my device, it is to be understood, nevertheless, that it is capable of use in other ways and, therefore, various adaptations in the location and arrangement of the several parts herein may be made without departing from the spirit of my invention as disclosed in the appended claims.

What I claim as new is:

1. In a tillage implement, a transverse frame member, a disk gang carrying a vertical shaft, a bracket to receive said shaft mounted upon the frame member and movable about a fore and aft pivot, a horizontally arranged lever on said shaft, a sector on said lever, a detent lug carried on said bracket and projecting upwardly to engage the sector, and means for maintaining said lever and sector in engaged relations.

2. In a tillage implement, a transverse frame member, a disk gang carrying a vertical shaft, a bracket to receive said shaft carried on the frame member and capable of lateral and axial adjustment thereon, a horizontally arranged hinged lever detachably carried on said shaft, a sector and detent for said lever and bracket, and means for moving said lever bodily and yieldingly holding it in position where the sector and detent are engaged.

3. In a tillage implement, a disk gang, a pivotal member on which said disk gang is carried, a lever hinged thereto, a sector and detent for said lever, a housing formed on said lever adjacent to the pivotal member, and a coiled spring carried in said housing between the pivotal member and said lever for yieldingly holding said sector and detent in engagement.

4. In a tillage implement, a frame, a disk gang therefor, a pivotal member for connecting said disk gang to the frame, a lever hinged to said pivotal member, a sector formed on said lever, a detent fixed on said frame, and means arranged between said pivotal member and lever and capable of moving said lever bodily about its pivot point with said pivotal member for the purpose of yieldingly holding said sector in engagement with the detent.

5. In a tillage implement, a frame, a disk gang therefor, a vertical shaft connected with said gang and rotatably mounted on said frame, a lever hinged to said vertical shaft and extending horizontally therefrom, a sector and detent for said lever, and means arranged between said vertical shaft and said lever for yieldingly holding said sector and detent in engagement.

6. In a tillage implement, a frame, a disk gang, a vertical shaft connected to said disk gang, a bearing adjustably mounted on said frame to receive said vertical shaft, a horizontal lever hinged to said vertical shaft, a sector on said lever, a detent carried on a portion of said bearing in position to engage with said sector, and means for moving said lever bodily to yieldingly hold said sector in engagement with the detent.

In testimony whereof I affix my signature, in the presence of two witnesses.

FREDRICK A. BUCKNAM.

Witnesses:
C. S. SHARP,
R. A. MARLAND.

Copies of this patent may be obtained for five cents each, by addressing the "Commissioner of Patents, Washington, D. C."